Figure 1:
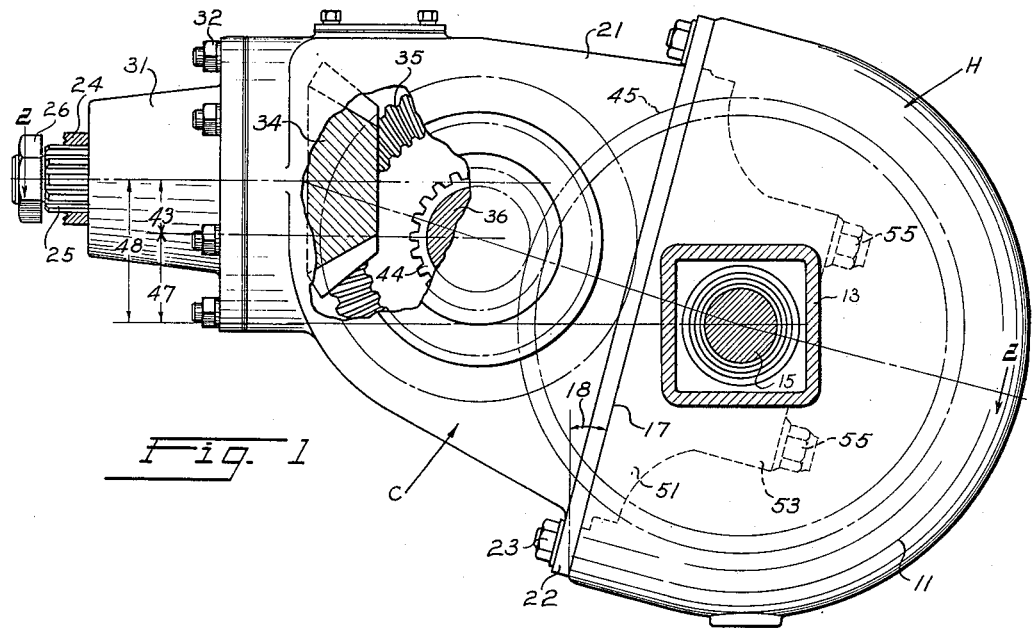

Sept. 4, 1945.     L. R. BUCKENDALE ET AL     2,383,954

DRIVE AXLE

Filed Nov. 20, 1942

Inventors.
Lawrence R. Buckendale
Nelson R. Brownyer
Beverly W. Keese
By Strauch & Hoffman
Attorneys Patented Sept. 4, 1945

2,383,954

UNITED STATES PATENT OFFICE 2,383,954

DRIVE AXLE

Lawrence R. Buckendale, Detroit, Mich., Nelson R. Brownyer, Shaker Heights, Ohio, and Beverly W. Keese, Oshkosh, Wis., assignors to The Timken-Detroit Axle Company, Detroit, Mich., a corporation of Ohio Application November 20, 1942, Serial No. 466,372

6 Claims. (Cl. 74—314)

The present invention relates to drive axles, and more particularly to multiple reduction drive axles for automotive vehicles, although it is not limited to such use.

Double reduction axles of both the top mounted type and the front mounted type have gone into wide use in the automotive field in trucks and like vehicles. In the top mounted axle a carrier supporting the gear mechanism is located directly over the axle housing, and while this type axle is advantageous from the standpoint of minimizing universal joint angularity, it requires so much head room that it cannot be applied to certain classes of vehicles. In the front mounted type, the gearing carrier is located forwardly of, and below, the top of the axle housing bowl, which renders it applicable to vehicles in which head room is limited, but it is open to the disadvantage that it presents a maximum overhang and, due to inertia, sets up strong rotative stresses in the axle arms in operation, and also it is necessary for the universal joints to operate at such great angularity that the joints wear more rapidly than in the top mounted axle.

We have found that by employing a front mounted carrier, bolted to the axle housing along a plane which inclines upwardly and rearwardly, so as to locate the countershaft materially above the level of the axle shafts, and locating the drive shaft in the carrier materially above the level of the countershaft, and transmitting power between the drive and countershafts by means of hypoid gearing, we are able to provide a structure having substantially all the advantages and none of the disadvantages of the top and front mounted double reduction axles of the prior art.

It is accordingly the primary object of this invention to provide a multiple reduction drive axle having a front mounted carrier which is so designed as to provide minimum overhang of the carrier and straighten out the drive line by making smaller angles in the propeller shafts, and which also makes possible a thoroughly successful shorter coupling between the axle housing nose and the transmission or auxiliary transmission of the vehicle to which it is applied.

A further important object is to provide a multiple reduction drive axle embodying a series of driving gear elements which are successively stepped above the level of the axle shafts, so as to locate the drive shaft sufficiently close to the plane of the vehicle transmission or other source of power to achieve a drive line of minimum angularity and length, and yet which requires no more head room than a conventional front mounted double reduction axle.

Another object is to provide a multiple reduction drive axle having a carrier, bolted to the axle housing along a plane so inclined to the vertical as to locate the countershaft above the level of the axle shafts, and embodying a drive shaft located above the level of the countershaft, and gearing for transmitting power from the drive shaft to the countershaft.

Another object is to provide, for front mounting on a vehicle axle housing, a carrier embodying a countershaft and a drive shaft and reduction gearing for transmitting power therebetween, the parts being so designed and cooperating in such manner as to locate the drive shaft above the level of the countershaft, and adapting the drive shaft for connection to a drive line of minimum length and angularity.

Further objects will become apparent as the specification proceeds in conjunction with the annexed drawing, and from the appended claims.

Figure 2:
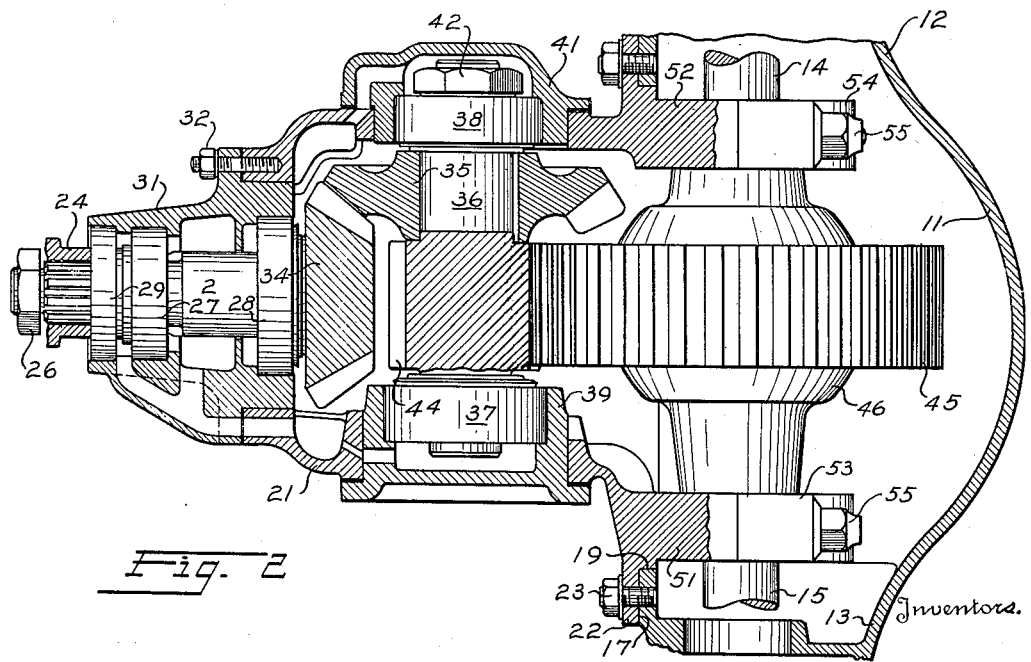

In the drawing:

Figure 1 is a side elevational view of a drive axle embodying the invention, one of the axle arms and a portion of the carrier being broken away to more clearly illustrate the construction, and, Figure 2 is a sectional view taken substantially on the line 2—2 of Figure 1, looking in the direction of the arrows.

With continued reference to the drawing, in which like reference characters have been employed to designate similar parts, we have illustrated the invention as being applied to a double reduction axle embodying a main housing H and an auxiliary housing or carrier C.

Housing H is provided with a center or bowl portion 11, and a pair of axle arms 12 and 13 in which a pair of axle shafts 14 and 15 are mounted for rotation in well known manner.

As seen in Figure 1, the axle arms 12 and 13 are preferably of rectangular formation and the axle housing is so tilted as to dispose its bolting face 17 at an angle 18 to the vertical, preferably at an angle of approximately fifteen degrees, for a purpose that will presently appear.

Referring to Figure 2, housing bolting face 17 is located adjacent an opening 19 in the housing through which all of the working parts are inserted. Carrier C is made up of a housing 21 having a bolting flange 22, which is secured to the bolting face 17 of the main housing by cap screws 23 or the like. Power is applied to the axle by means of a universal or like coupling structure 24, secured to the end of a drive shaft 25 by means of a nut 26. Shaft 25 is journalled in the carrier by means of anti-friction bearings 27 and 28, and a seal 29, mounted at the front end of the carrier, prevents the escape of lubricant and introduction of dirt during operation. Shaft 25, together with bearings 27 and 28, is preferably carried in a separate casing or nosing 31, which is secured to the forward end of the carrier by stud and nut assemblies 32.

The rectangular axle arms 12 and 13 are disposed with their top and bottom surfaces substantially horizontal, so that the vehicle springs may be bolted to spring pads provided thereon (not shown) in well known manner, thereby avoiding the necessity for angularly mounted spring pads.

We have discovered that by inclining bolting face 17 of the main housing rearwardly and upwardly with respect to the housing assembly, and by employing the novel combination of gears and shaft structure that will now be described, it is possible to maintain the maximum spacing between the axes of the spur pinion and spur gear, and yet obtain substantially all of the advantages of the front and top mounted double reduction axles, with substantially none of their disadvantages, making it possible to achieve a substantially straight drive line of minimum length from the transmission to the drive axle, without requiring excessive head room and at the same time achieving minimum angularity and minimum overhang.

To this end, shaft 25 carries a hypoid pinion gear 34 which meshes with a hypoid gear 35 rigidly carried by a counter or cross shaft 36. The latter is mounted in anti-friction bearings 37 and 38, which are respectively carried by cap members 39 and 41, seating in aligned openings in the carrier casing, the shaft being secured in assembled relationship with bearing 38 by means of a nut and lock washer assembly 42. By utilizing a hypoid pinion and gear, countershaft 36 is disposed a material distance below the plane of the axis of shaft 25, the difference in elevation being designated by the reference character 43 in Figure 1.

Shaft 36 is also provided with a preferably integral spur gear 44 which meshes with a spur gear 45, rigidly carried by a differential casing 46. Tilting the carrier by inclining the bolting face, as seen in Figure 1, locates the countershaft 36 a distance designated as 47 above the level or plane of the axle shaft axes. The total lift or elevation of the drive shaft axes above the level of the drive shaft in conventional double reduction front mounted axles is designated in Figure 1 as 48, the sum of offsets 43 and 47, thereby locating the drive shaft a material distance above the ground, and in substantial alignment with the output shaft from the transmission or auxiliary transmission of the motor vehicle, thereby straightening out the line making smaller angles between the propeller shafts, and also making practical the use of a shorter coupling, which is of particular advantage in tractor type trucks or in trucks having an auxiliary transmission, which cuts down the distance between the axle housing nose and the output of the auxiliary transmission.

Differential casing 46 is journalled in anti-friction bearings in a pair of supports 51 and 52, integrally formed with the carrier and projecting into the housing bowl, and having caps 53 and 54, respectively, secured in place by nuts 55 in well known manner. Casing 46 contains a differential of well known type for dividing the power between shafts 14 and 15.

From the foregoing detailed disclosure of the invention it is apparent that we have provided a multiple reduction drive axle in which the carrier does not extend above the level of the axle bowl, thereby requiring no greater head room than in a conventional front mounted axle, and yet the axis of drive shaft 25 has been raised a material distance above the level of the axle shafts, making it possible to straighten out the drive line and minimize propeller shaft angularity and utilize shorter couplings than have heretofore been feasible, and yet, by bringing the carrier and drive shaft structure somewhat closer to a vertical plane containing the axle shafts, minimum overhang of the structure is achieved and an axle achieved having substantially all the advantageous features of the top mounted and front mounted double reduction drive axles, and yet avoiding most of their disadvantages.

Although we have illustrated the invention as applied to a single speed double reduction axle, it is to be understood that by employing two or more sets of spur pinions and gears, with a clutch for selectively coupling the pinions to the countershaft, as disclosed in Buckendale Patent No. 2,183,667, dated December 19, 1939, multi-speed double reduction drive axles may readily be produced embodying the invention, and the appended claims are intended to embrace the invention when it assumes these forms. Also, it is to be understood that if desired other carrier structures embodying worm; planetary; or other primary reduction gears may be substituted for the hypoid carrier set illustrated, so long as the parts are so related as to locate the drive shaft above the level of the countershaft, without departing from the spirit of the invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive axle, an axle housing; a pair of axle shafts in said axle housing; an auxiliary housing secured to the front of said axle housing along a plane disposed substantially parallel to said axle shafts; a countershaft in said auxiliary housing above said axle shafts; gear means for transmitting power from said countershaft to said axle shafts, the axis of said countershaft being parallel to the vertical plane containing said axle shafts and displaced therefrom in the direction of said drive shaft; a drive shaft mounted for rotation in said auxiliary housing at a higher level than said countershaft; and gear means comprising intermeshing hypoid bevel gears for transmitting power from said drive shaft to said countershaft.

2. The drive axle defined in claim 1, wherein the plane along which said auxiliary housing is secured to said axle housing inclines upwardly and rearwardly with respect to said axle housing.

3. In a drive axle, a housing structure having oppositely disposed axle arms; an axle shaft in each axle arm; a series of rotatable means operably associated with said housing structure for transmitting power to said axle shafts, said means being mounted for rotation about axes which are successively stepped at higher levels than said axle shafts, and comprising a drive shaft located at a materially higher level than said axle shafts, and gear means embodying a countershaft located intermediate the levels of said drive shaft and said axle shafts, the axis of said countershaft being displaced from the vertical plane containing said axle shafts.

4. In a drive axle, an axle housing having oppositely disposed axle arms; an axle shaft in each axle arm; an auxiliary housing secured to said axle housing along a plane disposed parallel to said axle shafts and inclined upwardly and rearwardly with respect to said axle housing; a countershaft journalled in said auxiliary housing at a higher level than said axle shafts, the inclination of said housing serving to position said countershaft in a predetermined position at said higher level and displaced from the vertical plane containing said axle shafts; gear means for transmitting power from said countershaft to said axle shafts; and drive means, located at a higher level than said countershaft, for transmitting power thereto, all portions of said auxiliary housing being located at a lower level than the top of said axle housing, and said drive means comprising a drive shaft disposed substantially normal to and located at a higher level than said countershaft and hypoid gearing for transmitting power from said drive shaft to said countershaft.

5. In a drive axle, a housing; a gear carrier supported by said housing and wholly contained in a space below the highest part of said housing; a first spur gear supported in said housing by said carrier and drivingly connected with a pair of oppositely extending axle shafts; a second spur gear meshing with said first spur gear mounted on a cross shaft journalled in said carrier with its axis above the axis of said axle shafts; a propeller shaft section journalled in said carrier with its axis at right angles to and above the axis of said cross shaft; and a pair of hypoid bevel gears between said propeller shaft section and said cross shaft; whereby the axis of said propeller shaft section is positioned the maximum distance above the axis of said axle shafts without extending said carrier above said housing.

6. In a drive axle, a housing structure having oppositely disposed axle arms; an axle shaft in each axle arm; a differential housing between said axle arms; differential mechanism in said housing operatively connected with said axle shafts; a gear carrier secured to said differential housing; a countershaft journalled in said gear carrier gear connected with said differential mechanism, and a propeller shaft section journalled in said gear carrier and gear connected with said countershaft by a hypoid bevel gear train, the axis of said countershaft being disposed above a horizontal plane including the axes of said axle shafts and on the propeller shaft adjacent side of a vertical plane including the axes of said axle shafts, the axis of said propeller shaft section being disposed above a horizontal plane including the axis of said countershaft and all parts of said axle being included between two horizontal planes touching the top and bottom respectively of said differential housing when the axis of said propeller shaft section is substantially horizontal.

LAWRENCE R. BUCKENDALE.
NELSON R. BROWNYER.
BEVERLY W. KEESE.